United States Patent
Li et al.

(10) Patent No.: US 12,292,946 B1
(45) Date of Patent: May 6, 2025

(54) METHOD FOR IMPLEMENTING FORMAL VERIFICATION OF OPTIMIZED MULTIPLIER VIA SCA-SAT SYNERGY

(71) Applicant: SHANGHAITECH UNIVERSITY, Shanghai (CN)

(72) Inventors: Rui Li, Shanghai (CN); Lin Li, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 18/967,676

(22) Filed: Dec. 4, 2024

Related U.S. Application Data

(63) Continuation of application No. PCT/CN2024/085485, filed on Apr. 2, 2024.

(30) Foreign Application Priority Data

Jan. 16, 2024 (CN) .......................... 202410065035.7

(51) Int. Cl.
  *G06F 17/16* (2006.01)
(52) U.S. Cl.
  CPC .................... *G06F 17/16* (2013.01)
(58) Field of Classification Search
  CPC ....................................................... G06F 17/16
  (Continued)

(56) References Cited

U.S. PATENT DOCUMENTS

2014/0067897 A1   3/2014   Case

FOREIGN PATENT DOCUMENTS

| CN | 103838908 A | 6/2014 |
|---|---|---|
| CN | 106997408 A | 8/2017 |
| CN | 117785112 A | 3/2024 |

OTHER PUBLICATIONS

Jitendra Kumar, et al., Formal Verification of Integer Multiplier Circuits Using Binary Decision Diagrams, IEEE Transactions on Computer-Aided Design of Integrated Circuits and Systems, 2023, pp. 1365-1378, vol. 42 No.4.

(Continued)

*Primary Examiner* — Tan V Mai
(74) *Attorney, Agent, or Firm* — Bayramoglu Law Offices LLC

(57) ABSTRACT

A method for implementing formal verification of an optimized multiplier via symbolic computer algebra (SCA)-satisfiability (SAT) synergy includes: systematically recovering, by a reverse engineering algorithm, an adder tree from an optimized multiplier; 2) generating, by a constraint satisfaction algorithm, a reference multiplier only by using an adder based on a constraint condition; and 3) combining, by an SCA-based and SAT-based verification method, complementary advantages of SCA and SAT. In the verification framework, the method introduces a reference multiplier generator for generating a correct reference multiplier. The correct reference multiplier has both a structure similar to a structure of the optimized multiplier and a clear adder boundary. The clear adder boundary allows proving correctness of the correct reference multiplier through SCA-based verification. With a structural similarity between the reference multiplier and the optimized multiplier, the reference multiplier is used as a known correct model for SAT-based verification of the optimized multiplier.

4 Claims, 2 Drawing Sheets

(58) Field of Classification Search
USPC .......................................................... 708/232
See application file for complete search history.

(56) References Cited

OTHER PUBLICATIONS

Armin Biere, et al., GIMSATUL, ISASAT, KISSAT Entering the SAT Competition 2022.
Alan Mishchenko, et al., Improvements to Combinational Equivalence Checking, ICCAD, 2006, pp. 836-843.
Maciej Ciesielski, et al., Understanding Algebraic Rewriting for Arithmetic Circuit Verification: A Bit-Flow Model, IEEE Transactions on Computer-Aided Design of Integrated Circuits and Systems, 2020, pp. 1346-1357, vol. 39 No.6.
Luca Amaru, et al., SAT-Sweeping Enhanced for Logic Synthesis, IEEE, 2020.
Alireza Mahzoon, et al., REVSCA-2.0: SCA-Based Formal Verification of Nontrivial Multipliers Using Reverse Engineering and Local Vanishing Removal, IEEE Transactions on Computer-Aided Design of Integrated Circuits and Systems, 2022, pp. 1573-1586, vol. 41 No.5.
Alireza Mahzoon, et al., PolyCleaner: Clean your Polynomials before Backward Rewriting to Verify Million-gate Multipliers, ICCAD, 2018.
Alireza Mahzoon, et al., RevSCA: Using Reverse Engineering to Bring Light into Backward Rewriting for Big and Dirty Multipliers, DAC, 2019.

Algorithm 1 Partial Adder Tree Recovery Algorithm

Require: $n \times n$ reverse engineered multiplier $M$, with input $A$, $B$.
Ensure: Partial adder tree $T$ and partial product map $PPM$.
1: $FQ \leftarrow \{A \in M | A$ is an AND gate generating $PP_{ij}\}$; $T \leftarrow \emptyset$
2: $PPM[W_k] \leftarrow \{PP_{ij} = A_i \wedge B_j | k = i + j\}$ for all $0 \leq k < n$
3: while $FQ \neq \emptyset$ do
4:     $Block \leftarrow FQ.pop()$
5:     $PPM.deactivate(Block.input\_products)$
6:     $PPM.add(Block.output\_products)$
7:     if $Block$ is an $HA$ or $FA$ then
8:         $T.add(Block)$
9:     end if
10:     for each $F$ in $Block.adder\_fanouts$ do
11:         $FQ.push(F)$ if $F.adder\_fanins \subseteq T$
12:     end for
13: end while
14: Deactivate all products in $PPM$ with a *Primary Output* fanout.

FIG. 2

Algorithm 2 CP-SAT based Reference Multiplier Generation

Require: Partial adder tree $T$ and partial product map $PPM$.
Ensure: Automatically generated $n \times n$ reference multiplier $M_{ref}$.
1: Define initial decision step size = 2, initialize CP-SAT $Solver$
2: while $Solver.solution\_not\_found()$ && !Time-Out do
3:     for each weight $W_k$ do
4:         $Solver.add(Adder\ Input\ Selection\ Constraints)$
5:         $Solver.add(State\ Constraints)$
6:         $Solver.add(FSA\ Constraints)$
7:         $Solver.add(Unresolved\ Pin\ Constraints)$
8:     end for
9:     $Solver.solve()$
10:     Increase decision step size
11: end while
12: if $Solver.solution\_found()$ then
13:     Transform $Solver.solution()$ into PPA architecture
14:     Generate Verilog code for $M_{ref}$
15: end if

FIG. 3

METHOD FOR IMPLEMENTING FORMAL VERIFICATION OF OPTIMIZED MULTIPLIER VIA SCA-SAT SYNERGY

CROSS REFERENCE TO THE RELATED APPLICATIONS

This application is the continuation application of International Application No. PCT/CN2024/085485, filed on Apr. 2, 2024, which is based upon and claims priority to Chinese Patent Application No. 202410065035.7, filed on Jan. 16, 2024, the entire contents of which are incorporated herein by reference.

TECHNICAL FIELD

The present disclosure relates to a formal verification method for integer multipliers, and in particular to a method for implementing formal verification of an optimized multiplier via automated reference multiplier generation and symbolic computer algebra (SCA)-satisfiability (SAT) synergy.

BACKGROUND

In computer science and electronic engineering, an integer multiplier is a critical component and plays an important role in various hardware devices, including but not limited to an artificial intelligence (AI) chip, a central processing unit (CPU), and a graphic processing unit (GPU). These devices play important roles in people's daily lives, including data processing, graphic rendering, AI computing, and the like. Therefore, it is crucial to ensure correctness of these devices.

However, due to complexity of design and implementation, the integer multiplier may have design defects. These defects may decrease device performance, and even may cause a device to completely malfunction, just like the infamous Pentium FDIV bug. Although logic optimization can improve efficiency, an error may be introduced to an optimized multiplier in the logic optimization. Therefore, a method is needed to verify the correctness of these devices, which is a role of formal verification. Formal verification is a technique that uses a mathematical method to prove correctness of a system. It is crucial to perform the formal verification on the optimized multiplier to prevent a potential catastrophic defect.

Currently, there are a plurality of methods to formally verify the integer multiplier. One type of method relies on a known correct reference multiplier, including a binary decision diagram (BDD)-based method [1] and satisfiability (SAT)-based methods [2, 3]. Both the BDD-based method and the SAT-based methods prove correctness by proving unsatisfiability of a miter circuit composed of the optimized multiplier and the reference multiplier. Another type of method utilizes a symbolic computer algebra (SCA) technique [4], without requiring the reference multiplier. These techniques express a gate as a polynomial and gradually rewrite the polynomial from an output to an input, with a zero polynomial indicating the correctness.

However, due to the logic optimization, a large-scale optimized multiplier often lacks structurally similar references, and its adder has a blurred boundary. This poses a significant challenge to the state-of-the-art methods. The BDD-based method [1] can process miters of multipliers with different structures, but may cause node explosion for the large-scale optimized multiplier. The SAT-based methods [3, 5] attempt to reduce a problem scale by merging internal equivalent nodes in the miter circuit. The SAT-based methods can only process a miter composed of structurally similar multipliers, and cannot process a miter composed of multipliers with different structures due to scarcity of internal equivalent nodes. The SCA-based methods [6, 7, 8] utilize adder detection and vanishing monomials to prevent polynomial explosion, and has a significant effect on a multiplier with clear adder boundaries. However, for the optimized multiplier, these boundaries are blurred, and memory explosion often occurs.

CITED REFERENCES

[1] J. Kumar, Y Miyasaka, A. Srivastava, and M. Fujita, "Formal verification of integer multiplier circuits using binary decision diagrams," TCAD, vol. 42, no. 4, pp. 1365-1378, 2023.

[2] A. Biere and M. Fleury, "Gimsatul, IsaSAT and Kissat entering the SAT Competition 2022," in SAT Competition, vol. B-2022-1, 2022, pp. 10-11.

[3] A. Mishchenko, S. Chatterjee, R. Brayton, and N. Een, "Improvements to combinational equivalence checking," in ICCAD, 2006, p. 836-843.

[4] M. Ciesielski, T. Su, A. Yasin, and C. Yu, "Understanding algebraic rewriting for arithmetic circuit verification: Abit-flow model," TCAD, vol. 39, no. 6, pp. 1346-1357, 2020.

[5] L. Amarú, F. Marranghello, E. Testa, C. Casares, V. Possani, J. Luo, P. Vuillod, A. Mishchenko, and G. De Micheli, "Sat-sweeping enhanced for logic synthesis," in DAC, 2020, pp. 1-6.

[6] A. Mahzoon, D. Große, and R. Drechsler, "Revsca-2.0: Sca-based formal verification of nontrivial multipliers using reverse engineering and local vanishing removal," TCAD, vol. 41, no. 5, pp. 1573-1586, 2022.

[7] A. Mahzoon, D. Große, and R. Drechsler, "Polycleaner: Clean your polynomials before backward rewriting to verify million-gate multipliers," in ICCAD, 2018, pp. 1-8.

[8] A. Mahzoon, D. Große, and R. Drechsler, "Revsca: Using reverse engineering to bring light into backward rewriting for big and dirty multipliers," in DAC, 2019, pp. 1-6.

SUMMARY

An objective of the present disclosure is to ensure that an optimized multiplier can be verified.

In order to achieve the above objective, the technical solutions of the present disclosure provide a method for implementing formal verification of an optimized multiplier via SCA-SAT synergy, including following steps:

step 1: systematically recovering, by a reverse engineering algorithm, an adder tree from an optimized multiplier to ensure a structural similarity, where the reverse engineering algorithm includes atomic block detection and adder tree recovery;

the atomic block detection is used to detect constituent atomic blocks of an And-Inverter Graph (AIG) of the optimized multiplier, including a half adder (HA), a full adder (FA), an XOR gate, and an AND gate, systematically extract all cuts from the AIG through AIGcut enumeration based on a constructed library containing an atomic block truth table, and compare the mentioned cuts with the truth table in the library, where during the comparison, all the cuts are searched for, output vectors of the cuts are aligned with one output vector in the atomic block truth table library, and when an output vector displayed for a group of cuts with a common input is the same as an output vector in the atomic block truth table in the library, the group is identified as one atomic block; and the adder tree recovery algorithm utilizes, based on a breadth-first search (BFS) method, some reserved adder boundaries that provide significant structural information; the adder tree recovery algorithm maintains a front queue (FQ) including an HA/an FA/an AND gate that generates/consumes an unexplored partial product, and the FQ is initialized as all AND gates of generating initial $PP_{ij}$; the adder tree recovery algorithm also maintains a partial product map (PPM) from a weight $W_k$ to an active partial product, and the PPM is initialized as $PPM[W_k]=\{PP_{ij}\}$, k=i+j, where PPM $[W_k]$ represents a mapping from the weight $W_k$ to a partial product, and $PP_{ij}$ represents a partial product generated after $i^{th}$ and $j^{th}$ bits of a multiplier pass through the AND gate; then, the adder tree recovery algorithm iteratively dequeues an atomic block from the FQ, stops using a consumed partial product, and adds the generated partial product to the PPM; then, the adder tree recovery algorithm fans out an adder type of the atomic block, where a fanin HA/FA of the atomic block has been processed and added to the FQ; and when the FQ is empty, the adder tree recovery algorithm terminates, an accessed HA/FA and a connection form a partial adder tree, and a remaining partial product in the PPM needs to be further processed;

step 2: reserving, for each weight $W_k$ by the recovery algorithm, $R_k$ partial products that are represented as $PPM[W_k]=\{P_{k,0} \ldots P_{k,R_k-1}\}$, where 0≤k<2n, n represents a quantity of input bits of the multiplier, and $P_{k,R_k-1}$ represents an $(R_k-1)^{th}$ reserved partial product of the weight $W_k$; modeling a reconstructed PPA as a constraint satisfaction problem that is represented as an N-step planning process, where at each step, two decisions are made: whether to generate the FA/HA, and selection of an input of the FA/HA; a generated carry/sum is also used as an input of a subsequent FA/HA for tracking; and defining a selection matrix Sel and a state matrix State for each weight $W_k$, where based on the selection matrix Sel and the state matrix State, architectural constraints are generated to represent a generation process, including an adder input selection constraint, a state constraint, a Final Stage Adder (FSA) constraint and an unresolved pin constraint, and the constraints are encoded into a constraint programming (CP)-SAT solver to generate a satisfiable solution, which includes: starting from a small decision step, increasing a step size and re-adding the constraints until a solution is found or timeout occurs; and then, checking the selection matrix Sel to convert the solution into an actual PPA architecture, and generating Verilog code of the multiplier for verification; and step 3: after generating Verilog code of a reference multiplier, converting the Verilog code into an AIG and performing verification by using an SCA-based method; then creating a miter AIG from the optimized multiplier and the reference multiplier, and accelerating verification of SAT of the miter AIG through SAT sweeping, where the process starts with simulation of the miter AIG using a random input vector, and identifies all potential equivalent internal nodes based on a simulation result; next, using a Kissat 3.0 SAT solver to verify whether the nodes are indeed equivalent, and based on verification results of all the potential equivalent nodes, confirming that the equivalent nodes are merged to simplify the miter AIG; and repeating the above process until the SAT of the miter AIG is determined, and outputting a counterexample diagnostic error if the miter AIG is satisfiable, or confirming correctness of the optimized multiplier if the miter AIG is not satisfiable.

Preferably, in the step 1, the library encapsulates all functions of a Negation-Permutation-Negation (NPN) class of the atomic block.

Preferably, in the step 2, a size of the selection matrix Sel is N×H=$R_k$+2×N, where each row represents a decision step; a column represents an input candidate item of the generated FA/HA; the first $R_k$ columns correspond to the reserved partial products, where $P_{k,r}^s$=1 represents that an $r^{th}$ reserved partial product $P_{k,r}$ of the weight $W_k$ is selected in a step s; and next 2N columns represent a carry/sum generated from a previous/current weight, where $C_{k,i}^s$=1 represents that a carry/sum of the weight $W_k$ is selected in the step s, and the carry/sum is generated in a step i; and a size of the state matrix State is N×4, where an $i^{th}$ row represents a state of the carry/sum generated in the step i.

Preferably, in the step 2, the adder input selection constraint is expressed as follows:

$$1 \neq Sel_{row}^s = \left(\sum_{r=0}^{R_k} P_{k,r}^s + \sum_{i=0}^{N} C_{k,i}^s + \sum_{i=0}^{N} S_{k,i}^s\right) \leq 3, \forall 0 \leq s < N \quad (1)$$

$$\sum_{s=0}^{N} P_{k,r}^s \leq 1, \sum_{s=0}^{N} C_{k,i}^s \leq 1, \sum_{s=0}^{N} S_{k,i}^s \leq 1, \forall 0 \leq i < N, 0 \leq r < R_k \quad (2)$$

$$\neg Cg_k^i \Rightarrow \sum_{s=0}^{N} C_{k,i}^s = 0, \neg Sg_k^i \Rightarrow \sum_{s=0}^{N} S_{k,i}^s = 0, \forall 0 \leq i < N \quad (3)$$

where $S_{k,i}^s$ represents a sum of the weight $W_k$ selected in a step s, and the sum is generated in a step i; $Sel_{row}^s$ represents a sum of an $s^{th}$ row in the matrix Sel; $\neg C_{g_k}^i$ represents that a carry of the weight $W_k$ in the step i is not generated; $\neg S_{g_k}^i$ represents that a sum of the weight $W_k$ in the step i is not generated; the constraint (1) allows at most one adder per step by restricting the $Sel_{row}$ to 0, 2, or 3, and the $Sel_{row}$ represents the sum of the $s^{th}$ row of the matrix Sel; the constraint (2) restricts selection of a candidate input in a step by forcibly executing a unit column sum in the Sel; and the constraint (3) excludes an $i^{th}$ sum/carry that is not generated from being selected as an input of an adder;

the state constraint is expressed as follows:

$$Sel_{row}^i>1 \Rightarrow S_{g_k}^i, Sel_{row}^i>1 \Rightarrow C_{g_{k+1}}^i, \forall 0 \leq i < N \quad (4)$$

$$C_{k,i}^s \Rightarrow C_{c_k}^i, S_{k,i}^s \Rightarrow S_{c_k}^i, \forall 0 \leq s < N, \forall 0 \leq i < N \quad (5)$$

where $C_{c_k}^i$ represents that the carry of the weight $W_k$ in the step i is taken as an input by an other adder, and $S_{c_k}^i$ represents that the sum of the weight $W_k$ in the step i is taken as an input by the other adder; the constraint (4) is used to set a corresponding generation flag when the adder is created; and the constraint (5) is used to denote any sum/carry as consumed if selected as an input of a generated adder;

the FSA constraint is expressed as follows:

$$\sum_{j=0}^{N} F_{k,j} = \{1, 2\}, \sum_{s=0} P_{k,r}^s = 1 \Rightarrow \neg F_{k,r}, \forall\, 0 \le i < R_k \quad (6)$$

$$Cc_k^j \Rightarrow \neg F_{k,2\times i},\ Sc_k^j \Rightarrow F_{k,2\times i+1}, \forall\, 0 \le i < N \quad (7)$$

where if a Boolean vector variable $F_k$ of a length H is used to monitor the remaining partial product, the constraint (6) restricts $F_k$ to at most two remaining partial products to provide a required input for an FSA; and the constraint (7) prohibits inclusion of a consumed partial product, sum, and carry in the $F_k$; and the unresolved pin constraint: for a given weight $W_k$, there are P unresolved pins, a P×H Boolean matrix $U_k$ is established to indicate a connected partial product, and a Boolean implication constraint is used to model a reserved partial product in a fanout of the unresolved pin as zero in a $U_k$ entry; an N×H intermediate Boolean matrix is used to track a sum of paths that cause an illegal partial product, and if such a path exists, an implication constraint is generated; and finally, a sum of each row of the $U_k$ is 1 to ensure that each unresolved pin is connected, and a selected partial product is constrained as an illegal candidate item fed into the FSA.

The present disclosure provides a RefSCAT, which is a new verification framework for an optimized multiplier, including three steps: 1) systematically recovering, by a reverse engineering algorithm, an adder tree from an optimized multiplier to ensure a structural similarity; 2) generating, by a constraint satisfaction algorithm, a reference multiplier only by using an adder based on a constraint condition; and 3) combining, by an SCA-based and SAT-based verification method, complementary advantages of SCA and SAT, to correctly and quickly verify the optimized multiplier. In the aforementioned verification framework, the present disclosure introduces a reference multiplier generator for generating a correct reference multiplier. The correct reference multiplier has both a structure similar to a structure of the optimized multiplier and a clear adder boundary. The clear adder boundary allows proving correctness of the correct reference multiplier through SCA-based verification. With a structural similarity between the reference multiplier and the optimized multiplier, the reference multiplier is then used as a known correct model for SAT-based verification of the optimized multiplier.

BRIEF DESCRIPTION OF THE DRAWINGS

FIG. 2 schematically shows a partial adder tree extraction algorithm according to an embodiment of the present disclosure; and FIG. 3 schematically shows an automated multiplier generation algorithm based on constraint SAT according to an embodiment of the present disclosure.

DETAILED DESCRIPTION OF THE EMBODIMENTS

Figure 1:
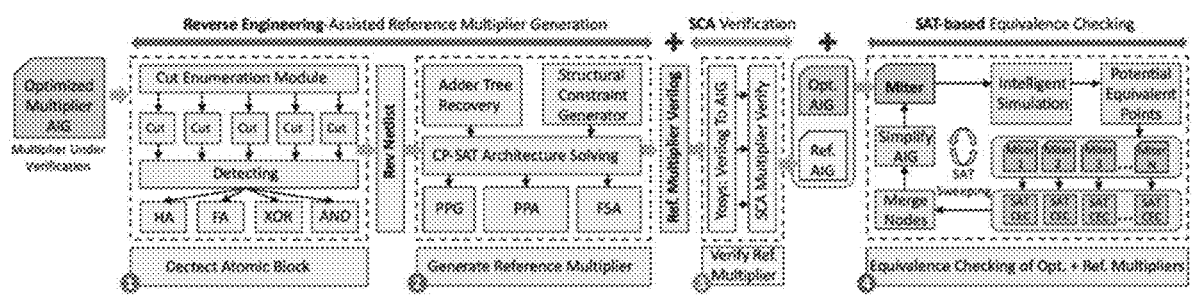
FIG. 1 shows an algorithm framework according to the present disclosure, including: 1) performing reverse engineering to add an optimized multiplier to a structural netlist; 2) innovatively synthesizing an auxiliary reference multiplier through constraint programming; 3) performing formal verification on the reference multiplier by using SCA; and 4) verifying equivalence between the reference multiplier and the optimized multiplier through SAT scanning.

The present disclosure will be further described in detail below with reference to specific embodiments. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent forms also fall within the scope defined by the appended claims of the present disclosure.

A method for implementing formal verification of an optimized multiplier via automated reference multiplier generation and SCA-SAT synergy provided in the embodiments of the present disclosure specifically includes the following steps:

Step 1: A reverse engineering algorithm systematically recovers an adder tree from an optimized multiplier to ensure a structural similarity. The reverse engineering algorithm includes atomic block detection and adder tree recovery. The atomic block detection is used to detect constituent atomic blocks of an AIG of the optimized multiplier, including an HA, an FA, an XOR gate, and an AND gate. In order to facilitate complete matching, the present disclosure constructs a library containing an atomic block truth table. The library encapsulates all functions of an NPN class of the atomic block. With this library, all cuts can be systematically extracted from the AIG of the optimized multiplier through AIGcut enumeration and compared with the truth table in the library. In this process, all the cuts are searched for, and their output vectors are aligned with an output vector in the atomic block truth table library. When an output vector displayed for a group of cuts with a common input is the same as an output vector in the atomic block truth table in the library, the group is identified as one atomic block. A result of this process is a structural netlist composed of interconnected atomic blocks.

Due to optimization, many adder boundaries are eliminated, but some boundaries that provide significant structural information are reserved. This is utilized by a proposed adder tree recovery algorithm based on a BFS method. The adder tree recovery algorithm maintains an FQ including an HA/an FA/an AND that generates/consumes an unexplored partial product, and the FQ is initialized as all ANDs of generating initial $PP_{ij}$. The adder tree recovery algorithm also maintains a PPM from weight $W_k$ to an active partial product, and initializes the PPM as $PPM[W_k]=\{PP_{ij}\}$, k=i+j, where $PPM[W_k]$ represents a mapping from the weight $W_k$ to a partial product, and $PP_{ij}$ represents a partial product generated after $i^{th}$ and $j^{th}$ bits of a multiplier pass through the AND gate. Then, the algorithm iteratively dequeues an atomic block from the FQ, stops using a consumed partial product, and adds the generated partial product to the PPM. For example, if an input weight of $HA_i$ is $W_k$, where the $HA_i$ represents an $i^{th}$ HA, generated sum $HA_i^s$/carry $HA_i^c$ is respectively added to the $PPM[W_k]$ and the $PPM[W_k]$. Then, an adder type of the atomic block is fanned out, where a fanin HA/FA of the atomic block has been processed and added to the FQ. When the FQ is empty, the algorithm terminates, and an accessed HA/FA and a connection form a partial adder tree. A remaining partial product in the PPM needs to be further processed.

Step 2: For each weight $W_k$, the recovery algorithm reserves $R_k$ partial products that are represented as PPM $[W_k]\{P_{k,0}\ \ldots\ P_{k,R_k-1}\}$, where 0≤k<2n, n represents a quantity of input bits of the multiplier, and $P_{k,R_k-1}$ represents an $(R_k-1)^{th}$ reserved partial product of the weight $W_k$. A main challenge is to reconstruct a PPA by using the FA and the HA to compress the PPM and connecting an unresolved pin to the adder tree. A reconstructed PPA is molded as a constraint satisfaction problem that is represented as an N-step planning process. At each step, two decisions are made: whether to generate the FA/HA, and selection of an input of the FA/HA. A generated carry/sum is also used as an input of a subsequent FA/HA for tracking. This is essentially complex due to a dependency relationship between a step/a weight. To facilitate this process, two Boolean variable matrices are defined for each weight $W_k$:

1) Selection matrix Sel: A size of the selection matrix Sel is N×H=$R_k$+2×N, where each row represents a decision step, and a column represents an input candidate item of the generated FA/HA. The first $R_k$ columns correspond to the reserved partial products, where $P_{k,r}^s=1$ represents that $r^{th}$ reserved partial product $P_{k,r}$ of the weight $W_k$ is selected in step s. Next 2N columns represent a carry/sum generated from a previous/current weight, where $C_{k,i}^s=1$ represents that a carry/sum of the weight $W_k$ is selected in the step s, and the carry/sum is generated in step i.

2) State matrix State: A size of the state matrix State is N×4, where an $i^{th}$ row represents a state of the carry/sum generated in the step i.

With these variables, architecture constraints can be generated to represent a generation process. It is noted that the following constraints should be applied to all weights $W_k$, where 0≤k<2n.

Adder input selection constraint: It is used to determine a step at which an available input is used to generate the HA/VA. The adder input selection constraint includes: constraint (1), which allows at most one adder per step by restricting $\text{Sel}_{row}$ to 0, 2, or 3, where the $\text{Sel}_{row}$ represents a sum of an $s^{th}$ row of the matrix Sel; constraint (2), which restricts selection of a candidate input in a step by forcibly executing a unit column sum in the Sel; and constraint (3), which excludes an $i^{th}$ sum/carry that is not generated from being selected as an input of an adder, as shown in the following formulas:

$$1 \neq Sel_{row}^s = \left(\sum_{r=0}^{R_k} P_{k,r}^s + \sum_{i=0}^{N} C_{k,i}^s + \sum_{i=0}^{N} S_{k,i}^s\right) \leq 3, \forall\, 0 \leq s < N \quad (1)$$

$$\sum_{s=0}^{N} P_{k,r}^s \leq 1, \sum_{s=0}^{N} C_{k,i}^s \leq 1, \sum_{s=0}^{N} S_{k,i}^s \leq 1, \forall\, 0 \leq i < N, 0 \leq r < R_k \quad (2)$$

$$\neg Cg_k^i \Rightarrow \sum_{s=0}^{N} C_{k,i}^s = 0, \neg Sg_k^i \Rightarrow \sum_{s=0}^{N} S_{k,i}^s = 0, \forall\, 0 \leq i < N \quad (3)$$

In the above formulas, $S_{k,i}^s$ represents a sum of the weight $W_k$ selected in the step s, and the sum is generated in the step i; $\text{Sel}_{row}^s$ represents the sum of the $s^{th}$ row in the matrix Sel; $\rightarrow C_{g_k}^i$ represents that a carry of the weight $W_k$ in the step i is not generated; and $\rightarrow S_{g_k}^i$ represents, that a sum of the weight $W_k$ in the step i is not generated.

State constraint: It is used to track generation and consumption of the sum/carry. The state constraint includes constraint (4), which is used to set a corresponding generation flag when the adder is created; and constraint (5), which is used to denote any sum/carry as consumed if selected as an input of a generated adder. These constraints together provide information needed to coordinate other constraints, as shown in the following formulas:

$$\text{Sel}_{row}^i > 1 \Rightarrow S_{g_k}^i, \text{Sel}_{row}^i > 1 \Rightarrow C_{g_{k+1}}^i, \forall\, 0 \leq i < N \quad (4)$$

$$C_{k,i}^s \Rightarrow C_{c_k}^i, S_{k,i}^s \Rightarrow S_{c_k}^i, \forall\, 0 \leq s < N, \forall\, 0 \leq i < N \quad (5)$$

In the above formulas, $C_{c_k}^i$ represents that the carry of the weight $W_k$ in the step i is taken as an input by an other adder, and $S_k$ represents that the sum of the weight $W_k$ in the step i is taken as an input by the other adder.

FSA constraint: It is used to forcibly establish a proper connection between the PPA and the FSA. Boolean vector variable $F_k$ of length H is used to monitor the remaining partial product. Constraint (6) restricts $F_k$ to at most two remaining partial products to provide a required input for the FSA. Constraint (7) prohibits inclusion of a consumed partial product, sum, and carry in the $F_k$, as shown in the following formulas:

$$\sum_{j=0}^{} F_{k,j} = \{1, 2\}, \sum_{s=0}^{N} P_{k,r}^s = 1 \Rightarrow \neg F_{k,r}, \forall\, 0 \leq i < R_k \quad (6)$$

$$Cc_k^i \Rightarrow \neg F_{k,2\times i}, Sc_k^i \Rightarrow F_{k,2\times i+1}, \forall\, 0 \leq i < N \quad (7)$$

Unresolved pin constraint: It is used to forcibly establish a proper connection between the adder tree and an unsolved pin. For given weight $W_k$, there are P unresolved pins, and P×H Boolean matrix $U_k$ is established to indicate a connected partial product. To avoid a combination loop, a Boolean implication constraint is used to model a reserved partial product in a fanout of the unresolved pin as zero in a $U_k$ entry. In addition, an N×H intermediate Boolean matrix is used to track a sum of paths that cause an illegal partial product, and if such a path exists, an implication constraint is generated. Finally, a sum of each row of the $U_k$ is 1 to ensure that each unresolved pin is connected, and a selected partial product is constrained as an illegal candidate item fed into the FSA.

The above constraints are encoded into a CP-SAT solver to generate a satisfiable solution. Starting from a small decision step, a step size is increased and the constraints are re-added until a solution is found or timeout occurs. Then, the matrix Sel is checked to convert the solution into an actual PPA architecture, and Verilog code for the multiplier is generated for verification.

Step 3: After Verilog code of a reference multiplier is generated, the Verilog code is converted into an AIG, and verification is performed by using an SCA-based method. Then a miter AIG is created from the optimized multiplier and the reference multiplier. Verification of SAT of the miter AIG is accelerated through SAT sweeping. The process starts with simulation of the miter AIG using a random input vector. All potential equivalent internal nodes are identified based on a simulation result. Next, a Kissat 3.0 SAT solver is used to verify whether the nodes are indeed equivalent. Based on verification results of all the potential equivalent nodes, it is confirmed that the equivalent nodes are merged to simplify the miter AIG. The above process is repeated until the SAT of the miter is determined. A counterexample diagnostic error is output if the miter AIG is satisfiable. Correctness of the optimized multiplier can be confirmed if the miter AIG is not satisfiable.

As shown in FIG. 2, a partial addition tree extraction algorithm proposed in the embodiments of the present disclosure maintains a queue called "FQ", which includes HAs, FAs, and ANDs that generate or consume unexplored partial products. This queue includes all AND gates of generating initial partial product $PP_{ij}$ during initialization. In addition, the system also maintains a mapping called "PPM", which maps weight $W_k$ into an active partial product and is initialized as $PPM[W_k]=\{PP_{ij}\}$, k=i+j. Then, the algorithm iteratively dequeues an atomic block from the FQ, stops using a consumed partial product, and adds a newly generated partial product to the PPM. For example, if an input weight of HA $HA_i$ is $W_k$, generated sum/carry $HA_i^s$/$HA_i^c$ is respectively added to $PPM[W_k]$ and $PPM[W_{k+1}]$. Then, an adder type fanout of an atomic block whose fanin HA/FA has been processed is added to the FQ. When the FQ is empty, the algorithm terminates, and an accessed HA/FA and a connection of the accessed HA/FA form a partial adder tree. A remaining partial product in the PPM needs to be further processed.

As shown in FIG. 3, in an automated multiplier generation algorithm based on constraint SAT proposed in the embodiments of the present disclosure, a size of a decision step is first initialized to 2, and a CP-SAT solver is also initialized. For each weight, the algorithm sequentially adds an adder input selection constraint, an adder state constraint, a constraint on a connection between different stages of a multiplier, and an unconnected pin constraint to the solver. Subsequently, the solver performs solving. If the solving is successful, the algorithm converts a result output by the solver into Verilog code of the multiplier. If the solving fails without timeout, the algorithm reinitializes the CP solver, increases the size of the decision step, adds the constraints again, and performs the solving.

The above technical solutions are implemented using a C++language, and a proposed multiplier verifier can formally verify a highly logically optimized multiplier circuit. By automatically generating a reference multiplier corresponding to an optimized multiplier, the technical solutions disclosed in the present disclosure can formally verify correctness of a considered multiplier quickly. In addition, if the considered multiplier is incorrect, the present disclosure can provide a corresponding input counterexample to represent an input under which the multiplier provides an incorrect output.

The invention claimed is:
1. A method for implementing formal verification of an optimized multiplier via symbolic computer algebra (SCA)-satisfiability (SAT) synergy, comprising the following steps:
  step 1: systematically recovering, by a reverse engineering algorithm, an adder tree from an optimized multiplier to ensure a structural similarity, wherein the reverse engineering algorithm comprises atomic block detection and an adder tree recovery algorithm;
    wherein the atomic block detection is used to detect constituent atomic blocks of an And-Inverter Graph (AIG) of the optimized multiplier, comprising a half adder (HA), a full adder (FA), an XOR gate, and an AND gate, systematically extract all cuts from the AIG through AIGcut enumeration based on a constructed library containing an atomic block truth table, and compare the mentioned cuts with the atomic block truth table in the constructed library, wherein during a comparison, all the cuts are searched for, output vectors of the cuts are aligned with one output vector in the constructed library containing the atomic block truth table, and when an output vector displayed for a group of cuts with a common input is same as an output vector in the atomic block truth table in the constructed library, the group is identified as one atomic block; and
    the adder tree recovery algorithm utilizes, based on a breadth-first search (BFS) method, some reserved adder boundaries that provide significant structural information; the adder tree recovery algorithm maintains a front queue (FQ) comprising an HA/an FA/an AND gate that generates/consumes an unexplored partial product, and the FQ is initialized as all AND gates of generating initial $PP_{ij}$; the adder tree recovery algorithm also maintains a partial product map (PPM) from a weight $W_k$ to an active partial product, and the PPM is initialized as $PPM[W_k]=\{PP_{ij}\}$, k=i+j, wherein $PPM[W_k]$ represents a mapping from the weight $W_k$ to a partial product, and $PP_{ij}$ represents a partial product generated after $i^{th}$ and $j^{th}$ bits of a multiplier pass through the AND gate; then, the adder tree recovery algorithm iteratively dequeues an atomic block from the FQ, stops using a consumed partial product, and adds the generated partial product to the PPM; then, the adder tree recovery algorithm fans out an adder type of the atomic block, wherein a fanin HA/FA of the atomic block has been processed and added to the FQ; and when the FQ is empty, the adder tree recovery algorithm terminates, an accessed HA/FA and a connection form a partial adder tree, and a remaining partial product in the PPM is required to be further processed;
  step 2: reserving, for each weight $W_k$ by the adder tree recovery algorithm, $R_k$ partial products that are represented as $PPM[W_k]=\{P_{k,0} \ldots P_{k,R_k-1}\}$, wherein $0 \le k < 2n$, n represents a quantity of input bits of the multiplier, and $P_{k,R_k-1}$ represents an $(R_k-1)^{th}$ reserved partial product of the weight $W_k$; modeling a reconstructed PPA as a constraint satisfaction problem that is represented as an N-step planning process, wherein at each step, two decisions are made: whether to generate the FA/HA, and selection of an input of the FA/HA; a generated carry/sum is also used as an input of a subsequent FA/HA for tracking; and defining a selection matrix Sel and a state matrix State for each weight $W_k$, wherein
    based on the selection matrix Sel and the state matrix State, architectural constraints are generated to represent a generation process, comprising an adder input selection constraint, a state constraint, a Final Stage Adder (FSA) constraint and an unresolved pin constraint, and the constraints are encoded into a constraint programming (CP)-SAT solver to generate a satisfiable solution; and the process comprises: starting from a small decision step, increasing a step size and re-adding the constraints until a solution is found or timeout occurs; and then, checking the selection matrix Sel to convert the solution into an actual PPA architecture, and generating Verilog code of the multiplier for verification; and
  step 3: after generating Verilog code of a reference multiplier, converting the Verilog code into an AIG and performing verification by using an SCA-based method; then creating a miter AIG from the optimized multiplier and the reference multiplier, and accelerating verification of SAT of the miter AIG through SAT sweeping, wherein the process starts with simulation of the miter AIG using a random input vector, and identifies all potential equivalent internal nodes based on a simulation result; next, using a Kissat 3.0 SAT solver to verify whether the nodes are indeed equivalent, and based on verification results of all the potential equivalent nodes, confirming that the equivalent nodes are merged to simplify the miter AIG; and repeating the above process until the SAT of the miter AIG is determined, and outputting a counterexample diagnostic error if the miter AIG is satisfiable, or confirming correctness of the optimized multiplier if the miter AIG is not satisfiable.

2. The method for implementing formal verification of the optimized multiplier via SCA-SAT synergy according to claim 1, wherein in the step 1, the constructed library encapsulates all functions of a Negation-Permutation-Negation (NPN) class of the atomic block.

3. The method for implementing formal verification of the optimized multiplier via SCA-SAT synergy according to claim 1, wherein in the step 2, a size of the selection matrix Sel is N×H=$R_k$+2×N, wherein each row represents a decision step; a column represents an input candidate item of the generated FA/HA; the first $R_k$ columns correspond to the reserved partial products, wherein $P_{k,r}^s$=1 represents that an $r^{th}$ reserved partial product $P_{k,r}$ of the weight $W_k$ is selected in a step s; and next 2N columns represent a carry/sum generated from a previous/current weight, wherein $C_{k,i}^s$=1 represents that a carry/sum of the weight $W_k$ is selected in the step s, and the carry/sum is generated in a step i; and a size of the state matrix State is N×4, wherein an $i^{th}$ row represents a state of the carry/sum generated in the step i.

4. The method for implementing formal verification of the optimized multiplier via SCA-SAT synergy according to claim 1, wherein in the step 2, the adder input selection constraint is expressed as follows:

$$1 \neq Sel_{row}^s = \left(\sum_{r=0}^{R_k} P_{k,r}^s + \sum_{i=0}^{N} C_{k,i}^s + \sum_{i=0}^{N} S_{k,i}^s\right) \leq 3, \forall\, 0 \leq s < N \quad (1)$$

$$\sum_{s=0}^{N} P_{k,r}^s \leq 1, \sum_{s=0}^{N} C_{k,i}^s \leq 1, \sum_{s=0}^{N} S_{k,i}^s \leq 1, \forall\, 0 \leq i < N, 0 \leq r < R_k \quad (2)$$

$$\neg\, Cg_k^i \Rightarrow \sum_{s=0}^{N} C_{k,i}^s = 0, \neg\, Sg_k^i \Rightarrow \sum_{s=0}^{N} S_{k,i}^s = 0, \forall\, 0 \leq i < N \quad (3)$$

wherein $S_{k,i}^s$ represents a sum of the weight $W_k$ selected in a step s, and the sum is generated in a step i; $Sel_{row}^s$ represents a sum of an $s^{th}$ row in the matrix Sel; $\neg\, C_{g_k}^i$ represents that a carry of the weight $W_k$ in the step i is not generated; $\neg\, S_{g_k}^i$ represents that a sum of the weight $W_k$ in the step i is not generated; the constraint (1) allows at most one adder per step by restricting the $Sel_{row}$ to 0, 2, or 3, and the $Sel_{row}$ represents the sum of the $s^{th}$ row of the matrix Sel; the constraint (2) restricts selection of a candidate input in a step by forcibly executing a unit column sum in the Sel; and the constraint (3) excludes an $i^{th}$ sum/carry that is not generated from being selected as an input of an adder;

the state constraint is expressed as follows:

$$Sel_{row}^i > 1 \Rightarrow S_{g_k}^i, Sel_{row}^i > 1 \Rightarrow C_{g_{k=1}}^i, \forall 0 \leq i < N \quad (4)$$

$$C_{k,i}^s \forall C_{c_k}^i, S_{k,i}^s \forall S_{c_k}^i, \forall 0 \leq s < N, \forall 0 \leq i < N \quad (5)$$

wherein $C_{c_k}^i$ represents that the carry of the weight $W_k$ in the step i is taken as an input by an other adder, and $S_{c_k}^i$, represents that the sum of the weight $W_k$ in the step i is taken as an input by the other adder; the constraint (4) is used to set a corresponding generation flag when the adder is created; and the constraint (5) is used to denote any sum/carry as consumed if selected as an input of a generated adder;

the FSA constraint is expressed as follows:

$$\sum_{j=0}^{N} F_{k,j} = \{1, 2\}, \sum_{s=0}^{N} P_{k,r}^s = 1 \Rightarrow \neg\, F_{k,r}, \forall\, 0 \leq i < R_k \quad (6)$$

$$Cc_k^i \Rightarrow \neg\, F_{k,2 \times i}, Sc_k^i \Rightarrow F_{k,2 \times i+1}, \forall\, 0 \leq i < N \quad (7)$$

wherein if a Boolean vector variable $F_k$ of a length H is used to monitor the remaining partial product, the constraint (6) restricts $F_k$ to at most two remaining partial products to provide a required input for an FSA; and the constraint (7) prohibits inclusion of a consumed partial product, sum, and carry in the $F_k$; and the unresolved pin constraint: for a given weight $W_k$, there are P unresolved pins, a P×H Boolean matrix $U_k$ is established to indicate a connected partial product, and a Boolean implication constraint is used to model a reserved partial product in a fanout of the unresolved pin as zero in a $U_k$ entry; an N×H intermediate Boolean matrix is used to track a sum of paths that cause an illegal partial product, and if such a path exists, an implication constraint is generated; and finally, a sum of each row of the $U_k$ is 1 to ensure that each unresolved pin is connected, and a selected partial product is constrained as an illegal candidate item fed into the FSA.

* * * * *